United States Patent
Jiang et al.

(10) Patent No.: US 9,460,501 B1
(45) Date of Patent: Oct. 4, 2016

(54) OBJECTIVE ASSESSMENT METHOD FOR STEREOSCOPIC VIDEO QUALITY BASED ON WAVELET TRANSFORM

(71) Applicant: Ningbo University, Ningbo, Zhejiang (CN)

(72) Inventors: Gangyi Jiang, Zhejiang (CN); Yang Song, Zhejiang (CN); Zongju Peng, Zhejiang (CN); Fen Chen, Zhejiang (CN); Kaihui Zheng, Zhejiang (CN); Shanshan Liu, Zhejiang (CN)

(73) Assignee: Ningbo University, Ningbo, Zhejiang (CN)

( * ) Notice: Subject to any disclaimer, the term of this patent is extended or adjusted under 35 U.S.C. 154(b) by 0 days.

(21) Appl. No.: 15/054,151

(22) Filed: Feb. 26, 2016

(30) Foreign Application Priority Data

Apr. 8, 2015 (CN) .......................... 2015 1 0164528

(51) Int. Cl.
  G06K 9/00  (2006.01)
  G06T 7/00  (2006.01)
  H04N 13/00  (2006.01)
  G06T 7/20  (2006.01)

(52) U.S. Cl.
  CPC ............. *G06T 7/0002* (2013.01); *G06T 7/206* (2013.01); *H04N 13/0007* (2013.01); *G06T 2207/10028* (2013.01); *H04N 2013/0081* (2013.01); *H04N 2013/0085* (2013.01)

(58) Field of Classification Search
  CPC ................. G06T 7/0002; G06T 7/206; G06T 2207/10028; H04N 13/0007; H04N 2013/0081; H04N 2013/0085
  See application file for complete search history.

(56) References Cited

U.S. PATENT DOCUMENTS

| 8,953,873 B2* | 2/2015 | Jiang | G06K 9/00201 382/154 |
| 2016/0029015 A1* | 1/2016 | Jiang | H04N 17/00 348/192 |

FOREIGN PATENT DOCUMENTS

CN    103841411    * 6/2014    ............. H04N 13/00

OTHER PUBLICATIONS

Campisi et al., "Stereoscopic Images Quality Assessment", Sep. 3, 2007, EURASIP, 15th European Signal Processing Conference, p. 2110-2114.*

(Continued)

*Primary Examiner* — Stephen R Koziol
*Assistant Examiner* — Timothy Choi

(57) ABSTRACT

An objective assessment method for a stereoscopic video quality based on a wavelet transform fuses brightness values of pixels in a left viewpoint image and a right viewpoint image of a stereoscopic image in a manner of binocular brightness information fusion, and obtains a binocular fusion brightness image of the stereoscopic image. The manner of binocular brightness information fusion overcomes a difficulty in assessing a stereoscopic perception quality of a stereoscopic video quality assessment to some extent and effectively increases an accuracy of a stereoscopic video objective quality assessment. When weighing qualities of each frame group in a binocular fusion brightness image video corresponding to a distorted stereoscopic video, the objective assessment method fully considers a sensitivity degree of a human eye visual characteristic to various types of information in the video, and determines a weight of each frame group based on a motion intensity and a brightness difference.

4 Claims, 1 Drawing Sheet

(56) References Cited

OTHER PUBLICATIONS

Wang et al., "Image Quality Assessment: From Error Visibility to Structural Similarity", Apr. 2004, IEEE, Transaction on Image Processing, vol. 13, No. 4, p. 1-14.*

Bensalma et al., "A perceptual metric for stereoscopic image quality assessment based on the binocular energy", Jun. 2013, Springer, Multidimensional Systems and Signal Processing, vol. 24, iss. 2, p. 281-316.*

Maalouf et al., "CYCLOP: A Stereo Color Image Quality Assessment Metric", May 27, 2011, IEEE, Int. Conf. on Acoustics, Speech and Signal Processing, p. 1161-1164.*

Moorthy et al., "Subjective evaluation of stereoscopic image quality", Sep. 2013, Elsevier, Signal Processing: Image Communication, vol. 28, iss. 8, p. 870-883.*

Silva et al., "Toward an Impairment Metric for Stereoscopic Video: A Full-Reference Video Quality Metric to Assess Compressed Stereoscopic Video", Sep. 2013, IEEE, Transaction on Image Processing, vol. 22, No. 9, p. 3392-3404.*

Yano et al., "A study of visual fatigue and visual comfort for 3D HDTV/HDTV images", Sep. 2002, Elsevier, Displays, vol. 23, iss. 4, p. 191-201.*

Sugie et al., "Neural Models of Brightness Perception and Retinal Rivalry in Binocular Vision", Jan. 1982, Springer-Verlag, Biological Cybernetics, vol. 43, iss. 1, p. 13-21.*

* cited by examiner

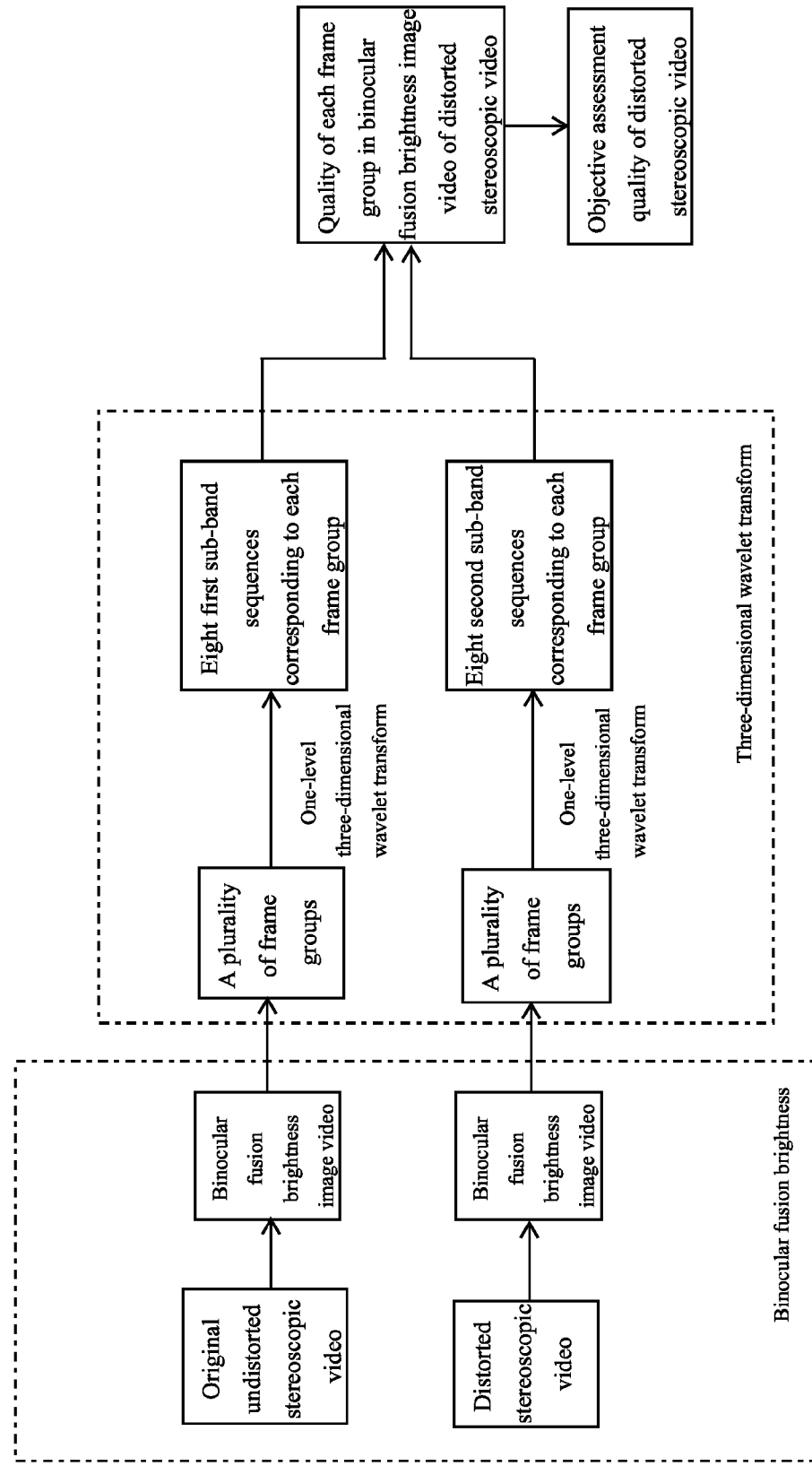

OBJECTIVE ASSESSMENT METHOD FOR STEREOSCOPIC VIDEO QUALITY BASED ON WAVELET TRANSFORM

CROSS REFERENCE OF RELATED APPLICATION

The present application claims priority under 35 U.S.C. 119(a-d) to CN 201510164528.7, filed Apr. 8, 2015.

BACKGROUND OF THE PRESENT INVENTION

1. Field of Invention

The present invention relates to a stereoscopic video quality assessment method, and more particularly to an objective assessment method for a stereoscopic video quality based on a wavelet transform.

2. Description of Related Arts

With the rapid development of the video coding technology and displaying technology, various types of video systems have been increasingly widely applied and gained attention, and gradually become the research focus in the information processing field. Because of the excellent watching experience, the stereoscopic video has become more and more popular, and the applications of the related technologies have greatly integrated into the current social life, such as the stereoscopic television, the stereoscopic film and the naked-eye 3D. However, during the process of capturing, compression, coding, transmission, and displaying of the stereoscopic video, it is inevitable to introduce different degrees and kinds of distortion due to a series of uncontrollable factors. Thus, how to accurately and effectively measure the video quality plays an important role in promoting the development of the various types of the video systems. The stereoscopic video quality assessment is divided into the subjective assessment and the objective assessment. The key of the current stereoscopic video quality assessment field is how to establish an accurate and effective objective assessment model to assess the objective quality of the stereoscopic video. Conventionally, most of the objective assessment methods for the stereoscopic video quality merely simply apply the plane video quality assessment method respectively for assessing the left viewpoint quality and the right viewpoint quality; such objective assessment methods fail to well deal with the relationship between the viewpoints nor consider the influence of the depth perception in the stereoscopic video on the stereoscopic video quality, resulting in the poor accuracy. Although some of the conventional methods consider the relationship between the two eyes, the weighting between the left viewpoint and the right viewpoint is unreasonable and fails to accurately describe the perception characteristics of the human eyes to the stereoscopic video. Moreover, most of the conventional time-domain weightings in the stereoscopic video quality assessment are merely a simple average weighting, while in fact the time-domain perception of the human eyes to the stereoscopic video is not merely the simple average weighting. Thus, the conventional objective assessment methods for the stereoscopic video quality fail to accurately reflect the perception characteristics of the human eyes, and have the inaccurate objective assessment results.

SUMMARY OF THE PRESENT INVENTION

An object of the present invention is to provide an objective assessment method for a stereoscopic video quality based on a wavelet transform, the method being able to effectively increase a correlation between an objective assessment result and a subjective perception.

Technical solutions of the present invention are described as follows.

An objective assessment method for a stereoscopic video quality based on a wavelet transform comprises steps of:

① representing an original undistorted stereoscopic video by $V_{org}$, and representing a distorted stereoscopic video to-be-assessed by $V_{dis}$;

② calculating a binocular fusion brightness of each pixel in each frame of a stereoscopic image of the $V_{org}$; denoting the binocular fusion brightness of a first pixel having coordinates of (u,v) in an f th frame of the stereoscopic image of the $V_{org}$ as $B_{org}^{f}(u,v)$, $B_{org}^{f}(u,v) = \sqrt{(I_{org}^{R,f}(u,v))^2 + (I_{org}^{L,f}(u,v))^2 + 2(I_{org}^{R,f}(u,v) \times I_{org}^{L,f}(u,v) \times \cos\partial) \times \lambda}$; then according to the respective binocular fusion brightnesses of all the pixels in each frame of the stereoscopic image of the $V_{org}$, obtaining a binocular fusion brightness image of each frame of the stereoscopic image in the $V_{org}$; denoting the binocular fusion brightness image of the f th frame of the stereoscopic image in the $V_{org}$ as $B_{org}^{f}$, wherein a second pixel having the coordinates of (u,v) in the $B_{org}^{f}$ has a pixel value of the $B_{org}^{f}(u,v)$; according to the respective binocular fusion brightness images of all the stereoscopic images in the $V_{org}$, obtaining a binocular fusion brightness image video corresponding to the $V_{org}$, denoted as $B_{org}$, wherein an f th frame of the binocular fusion brightness image in the $B_{org}$ is the $B_{org}^{f}$; and calculating a binocular fusion brightness of each pixel in each frame of a stereoscopic image of the $V_{dis}$; denoting the binocular fusion brightness of a third pixel having the coordinates of (u,v) in an f th frame of the stereoscopic image of the $V_{dis}$ as $B_{dis}^{f}(u,v)$, $B_{dis}^{f}(u,v) = \sqrt{(I_{dis}^{R,f}(u,v))^2 + (I_{dis}^{L,f}(u,v))^2 + 2(I_{dis}^{R,f}(u,v) \times I_{dis}^{L,f}(u,v) \times \cos\partial) \times \lambda}$; then according to the respective binocular fusion brightnesses of all the pixels in each frame of the stereoscopic image of the $V_{dis}$, obtaining a binocular fusion brightness image of each frame of the stereoscopic image in the $V_{dis}$; denoting the binocular fusion brightness image of the f th frame of the stereoscopic image in the $V_{dis}$ as $B_{dis}^{f}$, wherein a fourth pixel having the coordinates of (u,v) in the $B_{dis}^{f}$ has a pixel value of the $B_{dis}^{f}(u,v)$; according to the respective binocular fusion brightness images of all the stereoscopic images in the $V_{dis}$, obtaining a binocular fusion brightness image video corresponding to the $V_{dis}$, denoted as $B_{dis}$, wherein an f th frame of the binocular fusion brightness image in the $B_{dis}$ is the $B_{dis}^{f}$; wherein:

$1 \leq f \leq N_f$, wherein the f has an initial value of 1; the $N_f$ represents a total frame number of the stereoscopic images respectively in the $V_{org}$ and the $V_{dis}$; $1 \leq u \leq U, 1 \leq v \leq V$, wherein the U represents a width of the stereoscopic image respectively in the $V_{org}$ and the $V_{dis}$, and the V represents a height of the stereoscopic image respectively in the $V_{org}$ and the $V_{dis}$; the $I_{org}^{R,f}(u,v)$ represents a brightness value of a fifth pixel having the coordinates of (u,v) in a right viewpoint image of the f th frame of the stereoscopic image of the $V_{org}$; the $I_{org}^{L,f}(u,v)$ represents a brightness value of a sixth pixel having the coordinates of (u,v) in a left viewpoint image of the f th frame of the stereoscopic image of the $V_{org}$; the $I_{dis}^{R,f}(u,v)$ represents a brightness value of a seventh pixel having the coordinates of (u,v) in a right viewpoint image of the f th frame of the stereoscopic image of the $V_{dis}$; the $I_{dis}^{L,f}(u,v)$ represents a brightness value of an eighth pixel having the coordinates of (u,v) in a left viewpoint image of the f th frame of the stereoscopic image of the $V_{dis}$; the $\partial$ represents a fusion angle and the $\lambda$ represents a brightness parameter of a display;

③ adopting $2^n$ frames of the binocular fusion brightness images as a frame group; respectively dividing the $B_{org}$ and the $B_{dis}$ into $n_{GoF}$ frame groups; denoting an i th frame group in the $B_{org}$ as $G_{org}^{\ i}$; and denoting an i th frame group in the $B_{dis}$ as $G_{dis}^{\ i}$; wherein: the n is an integer in a range of $$[3,5];\ n_{GoF} = \left\lfloor \frac{N_f}{2^n} \right\rfloor,$$

wherein the $\lfloor\ \rfloor$ is a round-down symbol; and $1 \leq i \leq n_{GoF}$;

④ processing each frame group in the $B_{org}$ with a one-level three-dimensional wavelet transform, and obtaining eight groups of first sub-band sequences corresponding to each frame group in the $B_{org}$, wherein: the eight groups of the first sub-band sequences comprise four groups of first time-domain high-frequency sub-band sequences and four groups of first time-domain low-frequency sub-band sequences; and each group of the first sub-band sequence comprises $$\frac{2^n}{2}$$

first wavelet coefficient matrixes; and processing each frame group in the $B_{dis}$ with the one-level three-dimensional wavelet transform, and obtaining eight groups of second sub-band sequences corresponding to each frame group in the $B_{dis}$, wherein: the eight groups of the second sub-band sequences comprise four groups of second time-domain high-frequency sub-band sequences and four groups of second time-domain low-frequency sub-band sequences; and each group of the second sub-band sequence comprises $$\frac{2^n}{2}$$

second wavelet coefficient matrixes;

⑤ calculating respective qualities of two groups among the eight groups of the second sub-band sequences corresponding to each frame group in the $B_{dis}$; and denoting a quality of a j th group of the second sub-band sequence corresponding to the $G_{dis}^{\ i}$ as $$Q^{i,j},\ Q^{i,j} = \frac{\sum_{k=1}^{K} SSIM(VI_{org}^{i,j,k}, VI_{dis}^{i,j,k})}{K},$$

wherein: j=1,5; $1 \leq k \leq K$; the K represents a total number of the wavelet coefficient matrixes respectively in each group of the first sub-band sequence corresponding to each frame group in the $B_{org}$ and each group of the second sub-band sequence corresponding to each frame group in the $B_{dis}$;

$$K = \frac{2^n}{2};$$

the $VI_{org}^{i,j,k}$ represents a k th first wavelet coefficient matrix of a j th group of the first sub-band sequence corresponding to the $G_{org}^{\ i}$; the $VI_{dis}^{i,j,k}$ represents a k th second wavelet coefficient matrix of the j th group of the second sub-band sequence corresponding to the $G_{dis}^{\ i}$; the SSIM( ) is a structural similarity calculation function;

⑥ according to the respective qualities of the two groups among the eight groups of the second sub-band sequences corresponding to each frame group in the $B_{dis}$, calculating a quality of each frame group in the $B_{dis}$; and denoting the quality of the $G_{dis}^{\ i}$ as $Q_{GoF}^{\ i}$, $Q_{GoF}^{\ i} = w_G \times Q^{i,1} + (1-w_G) \times Q^{i,5}$, wherein: the $w_G$ is a weight of the $Q^{i,1}$; the $Q^{i,1}$ represents the quality of a first group of the second sub-band sequence corresponding to the $G_{dis}^{\ i}$; and the $Q^{i,5}$ represents the quality of a fifth group of the second sub-band sequence corresponding to the $G_{dis}^{\ i}$; and ⑦ according to the quality of each frame group in the $B_{dis}$, calculating an objective assessment quality of the $V_{dis}$ and denoting the objective assessment quality of the $V_{dis}$ as $Q_v$, $$Q_v = \frac{\sum_{i=1}^{n_{GoF}} w^i \times Q_{GoF}^i}{\sum_{i=1}^{n_{GoF}} w^i},$$

wherein the $w^i$ is a weight of the $Q_{GoF}^{\ i}$.

The $w^i$ in the step ⑦ is obtained through following steps:

⑦-1, calculating a motion vector of each pixel in each frame of the binocular fusion brightness image of the $G_{dis}^{\ i}$ except a first frame of the binocular fusion brightness image, with a reference to a previous frame of the binocular fusion brightness image of each frame of the binocular fusion brightness image in the $G_{dis}^{\ i}$ except the first frame of the binocular fusion brightness image;

⑦-2, according to the motion vector of each pixel in each frame of the binocular fusion brightness image of the $G_{dis}^{\ i}$ except the first frame of the binocular fusion brightness image, calculating a motion intensity of each frame of the binocular fusion brightness image in the $G_{dis}^{\ i}$ except the first frame of the binocular fusion brightness image; and denoting the motion intensity degree of an f'th frame of the binocular fusion brightness image in the $G_{dis}^{\ i}$ as $MA^{f'}$, $$MA^{f'} = \frac{1}{U \times V} \sum_{s=1}^{U} \sum_{t=1}^{V} ((mv_x(s,t))^2 + (mv_y(s,t))^2),$$

wherein: $2 \leq f' \leq 2^n$; the f' has an initial value of 2; $1 \leq s \leq U$, $1 \leq t \leq V$; the $mv_x(s,t)$ represents a horizontal component of the motion vector of a pixel having coordinates of (s,t) in the f'th frame of the binocular fusion brightness image in the $G_{dis}^{\ i}$, and the $mv_y(s,t)$ represents a vertical component of the pixel having the coordinates of (s,t) in the f'th frame of the binocular fusion brightness image in the $G_{dis}^{\ i}$;

⑦-3, calculating a motion intensity of the $G_{dis}^{\ i}$, denoted as $MAavg^i$, $$MAavg^i = \frac{\sum_{f'=2}^{2^n} MA^{f'}}{2^n - 1};$$

⑦-4, calculating a background brightness image of each frame of the binocular fusion brightness image in the $G_{dis}{}^i$; denoting the background brightness image of an f″th frame of the binocular fusion brightness image in the $G_{dis}{}^i$ as $BL_{dis}{}^{i,f''}$; and denoting a pixel value of a first pixel having coordinates of (p,q) in the $BL_{dis}{}^{i,f''}$ as $BL_{dis}{}^{i,f''}(p,q)$, $$BL_{dis}^{i,f''}(p,q) = \frac{1}{32} \sum_{bi=-2}^{2} \sum_{bj=-2}^{2} I_{dis}^{i,f''}(p+bi, q+bi) \times BO(bi+3, bj+3),$$

wherein: $1 \leq f'' \leq 2''$; $3 \leq p \leq U-2, 3 \leq q \leq V-2$; $-2 \leq bi \leq 2, -2 \leq bj \leq 2$; the $I_{dis}{}^{i,f''}(p+bi,q+bi)$ represents a pixel value of a pixel having coordinates of (p+bi,q+bi) in the f″th frame of the binocular fusion brightness image of the $G_{dis}{}^i$; and the BO(bi+3,bj+3) represents an element at a subscript of (bi+3,bj+3) in a 5×5 background brightness operator;

⑦-5, calculating a brightness difference image between each frame of the binocular fusion brightness image and the previous frame of the binocular fusion brightness image of each frame of the binocular fusion brightness image in the $G_{dis}{}^i$ except the first frame of the binocular fusion brightness image; denoting the brightness difference image between the f'th frame of the binocular fusion brightness image in the $G_{dis}{}^i$ and an f'−1th frame of the binocular fusion brightness image in the $G_{dis}{}^i$ as $LD_{dis}{}^{i,f'}$; and denoting a pixel value of a second pixel having the coordinates of (p,q) in the $LD_{dis}{}^{i,f'}$ as $LD_{dis}{}^{i,f'}(p, q)$, $$LD_{dis}{}^{i,f'}(p,q) = (I_{dis}{}^{i,f'}(p,q) - I_{dis}{}^{i,f'-1}(p,q) + BL_{dis}{}^{i,f'}(p,q) - BL_{dis}{}^{i,f'-1}(p,q))/2,$$

wherein: $2 \leq f' \leq 2''$; $3 \leq p \leq U-2, 3 \leq q \leq V-2$; the $I_{dis}{}^{i,f'}(p,q)$ represents a pixel value of a third pixel having the coordinates of (p,q) in the f'th frame of the binocular fusion brightness image in the $G_{dis}{}^i$; the $I_{dis}{}^{i,f'-1}(p,q)$ represents a pixel value of a fourth pixel having the coordinates of (p,q) in the f'−1th frame of the binocular fusion brightness image in the $G_{dis}{}^i$; the $BL_{dis}{}^{i,f'}(p,q)$ represents a pixel value of a fifth pixel having the coordinates of (p,q) in the background brightness image $BL_{dis}{}^{i,f'}$ of the f'th frame of the binocular fusion brightness image of the $G_{dis}{}^i$; and the $BL_{dis}{}^{i,f'-1}(p,q)$ represents a pixel value of a sixth pixel having the coordinates of (p,q) in the background brightness image $BL_{dis}{}^{i,f'-1}$ of the f'−1th frame of the binocular fusion brightness image of the $G_{dis}{}^i$;

⑦-6, calculating a mean value of the pixel values of all the pixels in the brightness difference image between each frame of the binocular fusion brightness image and the previous frame of the binocular fusion brightness image of each frame of the binocular fusion brightness image in the $G_{dis}{}^i$ except the first frame of the binocular fusion brightness image; denoting the mean value of the pixel values of all the pixels in the $LD_{dis}{}^{i,f'}$ as $LD^{i,f'}$; calculating a brightness difference value of the $G_{dis}{}^i$ and denoting the brightness difference value of the $G_{dis}{}^i$ as $LDavg^i$, $$LDavg^i = \frac{\sum_{f'=2}^{2^n} LD^{i,f'}}{2^n - 1};$$

⑦-7, obtaining a motion intensity vector of the $B_{dis}$ from the respective motion intensities of all the frame groups in the $B_{dis}$ in order, and denoting the motion intensity vector of the $B_{dis}$ as $V_{MAavg}$, $V_{MAavg} = [MAavg^1, MAavg^2, \ldots, MAavg^i, \ldots, MAavg^{n_{GoF}}]$;

obtaining a brightness difference vector of the $B_{dis}$ from the respective brightness difference values of all the frame groups in the $B_{dis}$ in order, and denoting the brightness difference vector of the $B_{dis}$ as $V_{LDavg}$, $V_{LDavg} = [LDavg^1, LDavg^2, \ldots, LDavg^i, \ldots, LDavg^{n_{GoF}}]$; wherein:

the $MAavg^1$, the $MAavg^2$, and the $MAavg^{n_{GoF}}$ respectively represent the motion intensities of a first frame group, a second frame group and a $n_{GoF}$-th frame group in the $B_{dis}$; the $LDavg^1$, the $LDavg^2$, and the $LDavg^{n_{GoF}}$ respectively represent the brightness difference values of the first frame group, the second frame group and the $n_{GoF}$-th frame group in the $B_{dis}$;

⑦-8, processing the $MAavg^i$ with a normalization calculation, and obtaining a normalized motion intensity of the $G_{dis}{}^i$, denoted as $v_{MAavg}^{norm,i}$, $$v_{MAavg}^{norm,i} = \frac{MAavg^i - \max(V_{MAavg})}{\max(V_{MAavg}) - \min(V_{MAavg})};$$

processing the $LDavg^i$ with the normalization calculation, and obtaining a normalized brightness difference value of the $G_{dis}{}^i$, denoted as $v_{LDavg}^{norm,i}$, $$v_{LDavg}^{norm,i} = \frac{LDavg^i - \max(V_{LDavg})}{\max(V_{LDavg}) - \min(V_{LDavg})};$$

wherein the max( ) is a function to find a maximum and the min( ) is a function to find a minimum; and ⑦-9, according to the $v_{MAavg}^{norm,i}$ and the $v_{LDavg}^{norm,i}$, calculating the weight $w^i$ of the $Q_{GoF}{}^i$, $w^i = (1 - v_{MAavg}^{norm,i}) \times v_{LDavg}^{norm,i}$.

Preferably, in the step ⑥, $w_G = 0.8$.

Compared with the conventional technology, the present invention has following advantages.

Firstly, the present invention fuses the brightness value of the pixels in the left viewpoint image with the brightness value of the pixels in the right viewpoint image in the stereoscopic image in a manner of binocular brightness information fusion, and obtains the binocular fusion brightness image of the stereoscopic image. The manner of binocular brightness information fusion overcomes a difficulty in assessing a stereoscopic perception quality of the stereoscopic video quality assessment to some extent and effectively increases an accuracy of the stereoscopic video objective quality assessment.

Secondly, the present invention applies the three-dimensional wavelet transform in the stereoscopic video quality assessment. Each frame group in the binocular fusion brightness image video is processed with the one-level three-dimensional wavelet transform, and video time-domain information is described through a wavelet domain decomposition, which solves a difficulty in describing the video time-domain information to some extent and effectively increases the accuracy of the stereoscopic video objective quality assessment.

Thirdly, when weighing the quality of each frame group in the binocular fusion brightness image video corresponding to the distorted stereoscopic video, the method provided by the present invention fully considers a sensitivity degree of a human eye visual characteristic to various kinds of information in the video, and determines the weight of each frame group based on the motion intensity and the brightness difference. Thus, the stereoscopic video quality assessment method, provided by the present invention, is more conform to a human eye subjective perception characteristic.

These and other objectives, features, and advantages of the present invention will become apparent from the following detailed description, the accompanying drawings, and the appended claims.

BRIEF DESCRIPTION OF THE DRAWINGS

The figure is an implementation block diagram of an objective assessment method for a stereoscopic video quality based on a wavelet transform according to a preferred embodiment of the present invention.

DETAILED DESCRIPTION OF THE PREFERRED EMBODIMENT

The present invention is further described with an accompanying drawing and a preferred embodiment of the present invention.

According to a preferred embodiment of the present invention, the present invention provides an objective assessment method for a stereoscopic video quality based on a wavelet transform, wherein an implementation block diagram thereof is showed in the figure, comprising steps of:

① representing an original undistorted stereoscopic video by $V_{org}$, and representing a distorted stereoscopic video to-be-assessed by $V_{dis}$;

② calculating a binocular fusion brightness of each pixel in each frame of a stereoscopic image of the $V_{org}$; denoting the binocular fusion brightness of a first pixel having coordinates of (u,v) in an f th frame of the stereoscopic image of the $V_{org}$ as $B_{org}^{f}(u,v)$, $B_{org}^{f}(u,v) = \sqrt{(I_{org}^{R,f}(u,v))^2 + (I_{org}^{L,f}(u,v))^2 + 2(I_{org}^{R,f}(u,v) \times I_{org}^{L,f}(u,v) \times \cos\partial) \times \lambda}$; then according to the respective binocular fusion brightnesses of all the pixels in each frame of the stereoscopic image of the $V_{org}$, obtaining a binocular fusion brightness image of each frame of the stereoscopic image in the $V_{org}$; denoting the binocular fusion brightness image of the f th frame of the stereoscopic image in the $V_{org}$ as $B_{org}^{f}$, wherein a second pixel having the coordinates of (u,v) in the $B_{org}^{f}$ has a pixel value of the $B_{org}^{f}(u,v)$; according to the respective binocular fusion brightness images of all the stereoscopic images in the $V_{org}$, obtaining a binocular fusion brightness image video corresponding to the $V_{org}$, denoted as $B_{org}$, wherein an f th frame of the binocular fusion brightness image in the $B_{org}$ is the $B_{org}^{f}$; and calculating a binocular fusion brightness of each pixel in each frame of a stereoscopic image of the $V_{dis}$; denoting the binocular fusion brightness of a third pixel having the coordinates of (u,v) in an f th frame of the stereoscopic image of the $V_{dis}$ as $B_{dis}^{f}(u,v)$, $B_{dis}^{f}(u,v) = \sqrt{(I_{dis}^{R,f}(u,v))^2 + (I_{dis}^{L,f}(u,v))^2 + 2(I_{dis}^{R,f}(u,v) \times I_{dis}^{L,f}(u,v) \times \cos\partial) \times \lambda}$; then according to the respective binocular fusion brightnesses of all the pixels in each frame of the stereoscopic image of the $V_{dis}$, obtaining a binocular fusion brightness image of each frame of the stereoscopic image in the $V_{dis}$; denoting the binocular fusion brightness image of the f th frame of the stereoscopic image in the $V_{dis}$ as $B_{dis}^{f}$, wherein a fourth pixel having the coordinates of (u,v) in the $B_{dis}^{f}$ has a pixel value of the $B_{dis}^{f}(u,v)$; according to the respective binocular fusion brightness images of all the stereoscopic images in the $V_{dis}$, obtaining a binocular fusion brightness image video corresponding to the $V_{dis}$, denoted as $B_{dis}$, wherein an f th frame of the binocular fusion brightness image in the $B_{dis}$ is the $B_{dis}^{f}$; wherein:

$1 \leq f \leq N_f$, wherein the f has an initial value of 1; the $N_f$ represents a total frame number of the stereoscopic images respectively in the $V_{org}$ and the $V_{dis}$; $1 \leq u \leq U, 1 \leq v \leq V$, wherein the U represents a width of the stereoscopic image respectively in the $V_{org}$ and the $V_{dis}$, and the V represents a height of the stereoscopic image respectively in the $V_{org}$ and the $V_{dis}$; the $I_{org}^{R,f}(u,v)$ represents a brightness value of a fifth pixel having the coordinates of (u,v) in a right viewpoint image of the f th frame of the stereoscopic image of the $V_{org}$; the $I_{org}^{L,f}(u,v)$ represents a brightness value of a sixth pixel having the coordinates of (u,v) in a left viewpoint image of the f th frame of the stereoscopic image of the $V_{org}$; the $I_{dis}^{R,f}(u,v)$ represents a brightness value of a seventh pixel having the coordinates of (u,v) in a right viewpoint image of the f th frame of the stereoscopic image of the $V_{dis}$; the $I_{dis}^{L,f}(u,v)$ represents a brightness value of an eighth pixel having the coordinates of (u,v) in a left viewpoint image of the f th frame of the stereoscopic image of the $V_{dis}$; the $\partial$ represents a fusion angle, wherein it is embodied that $\partial = 120°$ herein; and the $\lambda$ represents a brightness parameter of a display, wherein it is embodied that $\lambda = 1$ herein;

③ adopting $2^n$ frames of the binocular fusion brightness images as a frame group; respectively dividing the $B_{org}$ and the $B_{dis}$ into $n_{GoF}$ frame groups; denoting an i th frame group in the $B_{org}$ as $G_{org}^{i}$; and denoting an i th frame group in the $B_{dis}$ as $G_{dis}^{i}$; wherein: the n is an integer in a range of [3,5], wherein it is embodied that n=4 herein, namely adopting sixteen frames of the binocular fusion brightness images as the frame group; during a practical implementation, if a frame number of the binocular fusion brightness images respectively in the $B_{org}$ and the $B_{dis}$ is not a positive integral multiple of $2^n$, after orderly dividing the binocular fusion brightness images into a plurality of the frame groups, the redundant frames of the binocular fusion brightness images are not processed;

$$n_{GoF} = \left\lfloor \frac{N_f}{2^n} \right\rfloor,$$

wherein the $\lfloor \ \rfloor$ is a round-down symbol; and $1 \leq i \leq n_{GoF}$;

④ processing each frame group in the $B_{org}$ with a one-level three-dimensional wavelet transform, and obtaining eight groups of first sub-band sequences corresponding to each frame group in the $B_{org}$, wherein: the eight groups of the first sub-band sequences comprise four groups of first time-domain high-frequency sub-band sequences and four groups of first time-domain low-frequency sub-band sequences; and each group of the first sub-band sequence comprises $$\frac{2^n}{2}$$

first wavelet coefficient matrixes; herein, the four groups of the first time-domain high-frequency sub-band sequences corresponding to each frame group in the $B_{org}$ are respectively an original time-domain high-frequency approximate sequence $HLL_{org}$, an original time-domain high-frequency horizontal detail sequence $HLH_{org}$, an original time-domain high-frequency vertical detail sequence $HHL_{org}$, and an original time-domain high-frequency diagonal detail sequence $HHH_{org}$; and the four groups of the first time-domain low-frequency sub-band sequences corresponding to each frame group in the $B_{org}$ are respectively an original time-domain low-frequency approximate sequence $LLL_{org}$, an original time-domain low-frequency horizontal detail sequence $LLH_{org}$, an original time-domain low-frequency vertical detail sequence $LHL_{org}$, and an original time-domain low-frequency diagonal detail sequence $LHH_{org}$; and processing each frame group in the $B_{dis}$ with the one-level three-dimensional wavelet transform, and obtaining eight groups of second sub-band sequences corresponding to each frame group in the $B_{dis}$, wherein: the eight groups of the second sub-band sequences comprise four groups of second time-domain high-frequency sub-band sequences and four groups of second time-domain low-frequency sub-band sequences; each group of the second sub-band sequence comprises $$\frac{2^n}{2}$$

second wavelet coefficient matrixes; herein, the four groups of the second time-domain high-frequency sub-band sequences corresponding to each frame group in the $B_{dis}$ are respectively a distorted time-domain high-frequency approximate sequence $HLL_{dis}$, a distorted time-domain high-frequency horizontal detail sequence $HLH_{dis}$, a distorted time-domain high-frequency vertical detail sequence $HHL_{dis}$, and a distorted time-domain high-frequency diagonal detail sequence $HHH_{dis}$; and the four groups of the second time-domain low-frequency sub-band sequences corresponding to each frame group in the $B_{dis}$ are respectively a distorted time-domain low-frequency approximate sequence $LLL_{dis}$, a distorted time-domain low-frequency horizontal detail sequence $LLH_{dis}$, a distorted time-domain low-frequency vertical detail sequence $LHL_{dis}$, and a distorted time-domain low-frequency diagonal detail sequence $LHH_{dis}$; wherein:

in the present invention, the binocular fusion brightness image videos are processed with a time-domain decomposition through the three-dimensional wavelet transform; video time-domain information is described based on frequency components; and to finish processing the time-domain information in a wavelet domain solves a difficulty of a time-domain quality assessment in the video quality assessment to some extent and increases an accuracy of the assessment method;

⑤ calculating respective qualities of two groups among the eight groups of the second sub-band sequences corresponding to each frame group in the $B_{dis}$; and denoting a quality of a j th group of the second sub-band sequence corresponding to the $G_{dis}{}^i$ as $Q^{i,j}$, $$Q^{i,j}, Q^{i,j} = \frac{\sum_{k=1}^{K} SSIM(VI_{org}^{i,j,k}, VI_{dis}^{i,j,k})}{K},$$

wherein:

j=1,5, wherein: a first group of the second sub-band sequence corresponding to the $G_{dis}{}^i$ is a first group of the second time-domain high-frequency sub-band sequence corresponding to the $G_{dis}{}^i$ when j=1; and a fifth group of the second sub-band sequence corresponding to the $G_{dis}{}^i$ is a first group of the second time-domain low-frequency sub-band sequence corresponding to the $G_{dis}{}^i$ when j=5;

1≤k≤K, wherein: the K represents a total number of the wavelet coefficient matrixes respectively in each group of the first sub-band sequence corresponding to each frame group in the $B_{org}$ and each group of the second sub-band sequence corresponding to each frame group in the $B_{dis}$; and $$K = \frac{2^n}{2};$$

the $VI_{org}{}^{i,j,k}$ represents a k th first wavelet coefficient matrix of a j th group of the first sub-band sequence corresponding to the $G_{org}{}^i$;

the $VI_{dis}{}^{i,j,k}$ represents a k th second wavelet coefficient matrix of the j th group of the second sub-band sequence corresponding to the $G_{dis}{}^i$; and SSIM( ) is a structural similarity calculation function, $$SSIM(VI_{org}^{i,j,k}, VI_{dis}^{i,j,k}) = \frac{(2\mu_{org}\mu_{dis} + c_1)(2\sigma_{org-dis} + c_2)}{(\mu_{org}^2 + \mu_{dis}^2 + c_1)(\sigma_{org}^2 + \sigma_{dis}^2 + c_2)},$$

wherein: the $\mu_{org}$ represents a mean value of values of all elements in the $VI_{org}{}^{i,j,k}$; the $\mu_{dis}$ represents a mean value of values of all elements in the $VI_{dis}{}^{i,j,k}$; the $\sigma_{org}$ represents a variance of the $VI_{org}{}^{i,j,k}$; the $\sigma_{dis}$ represents a variance of the $VI_{dis}{}^{i,j,k}$; the $\sigma_{org-dis}$ represents a covariance between the $VI_{org}{}^{i,j,k}$ and the $VI_{dis}{}^{i,j,k}$; both the $c_1$ and the $c_2$ are constants; the $c_1$ and the $c_2$ prevents a denominator from being 0; and it is embodied that $c_1$=0.05 and $c_2$=0.05 herein;

⑥ according to the respective qualities of two groups among the eight groups of the second sub-band sequences corresponding to each frame group in the $B_{dis}$, calculating a quality of each frame group in the $B_{dis}$; and denoting the quality of the $G_{dis}{}^i$ as $Q_{GoF}{}^i$, $Q_{GoF}{}^i = w_G \times Q^{i,1} + (1-w_G) \times Q^{i,5}$, wherein: the $w_G$ is a weight of the $Q^{i,1}$, wherein it is embodied that $w_G$=0.8 herein; the $Q^{i,1}$ represents the quality of the first group of the second sub-band sequence corresponding to the $G_{dis}{}^i$, namely the quality of the first group of the second time-domain high-frequency sub-band sequence corresponding to the $G_{dis}{}^i$; the $Q^{i,5}$ represents the quality of the fifth group of the second sub-band sequence corresponding to the $G_{dis}{}^i$, namely the quality of the first group of the second time-domain low-frequency sub-band sequence corresponding to the $G_{dis}{}^i$; and ⑦ according to the quality of each frame group in the $B_{dis}$, calculating an objective assessment quality of the $V_{dis}$ and denoting the objective assessment quality of the $V_{dis}$ as $Q_v$, $$Q_v = \frac{\sum_{i=1}^{n_{GoF}} w^i \times Q_{GoF}^i}{\sum_{i=1}^{n_{GoF}} w^i},$$

wherein: the $w^i$ is a weight of the $Q_{GoF}{}^i$; and it is embodied that the $w^i$ is obtained through following steps:

⑦-1, calculating a motion vector of each pixel in each frame of the binocular fusion brightness image of the $G_{dis}{}^i$ except a first frame of the binocular fusion brightness image, with a reference to a previous frame of the binocular fusion brightness image of each frame of the binocular fusion brightness image in the $G_{dis}{}^i$ except the first frame of the binocular fusion brightness image;

⑦-2, according to the motion vector of each pixel in each frame of the binocular fusion brightness image of the $G_{dis}{}^i$ except the first frame of the binocular fusion brightness image, calculating a motion intensity of each frame of the binocular fusion brightness image in the $G_{dis}{}^i$ except the first frame of the binocular fusion brightness image; and denoting the motion intensity of an f'th frame of the binocular fusion brightness image in the $G_{dis}{}^i$ as $MA^{f'}$, $$MA^{f'} = \frac{1}{U \times V}\sum_{s=1}^{U}\sum_{t=1}^{V}((mv_x(s,t))^2 + (mv_y(s,t))^2),$$

wherein: $2 \leq f' \leq 2^n$; the f' has an initial value of 2; $1 \leq s \leq U$, $1 \leq t \leq V$; the $mv_x(s,t)$ represents a horizontal component of the motion vector of a pixel having coordinates of (s,t) in the f'th frame of the binocular fusion brightness image in the $G_{dis}{}^i$; and the $mv_y(s,t)$ represents a vertical component of the pixel having the coordinates of (s,t) in the f'th frame of the binocular fusion brightness image in the $G_{dis}{}^i$;

⑦-3, calculating a motion intensity of the $G_{dis}{}^i$, denoted as $MAavg^i$, $$MAavg^i = \frac{\sum_{f'=2}^{2^n} MA^{f'}}{2^n - 1};$$

⑦-4, calculating a background brightness image of each frame of the binocular fusion brightness image in the $G_{dis}{}^i$; denoting the background brightness image of an f''th frame of the binocular fusion brightness image in the $G_{dis}{}^i$ as $BL_{dis}{}^{i,f''}$; and denoting a pixel value of a first pixel having coordinates of (p,q) in the $BL_{dis}{}^{i,f''}$ as $BL_{dis}{}^{i,f''}(p,q)$, $$BL_{dis}^{i,f''}(p,q) = \frac{1}{32}\sum_{bi=-2}^{2}\sum_{bj=-2}^{2} I_{dis}^{i,f''}(p+bi, q+bi) \times BO(bi+3, bj+3),$$

wherein: $1 \leq f'' \leq 2^n$; $3 \leq p \leq U-2, 3 \leq q \leq V-2$; $-2 \leq bi \leq 2, -2 \leq bj \leq 2$; the $I_{dis}{}^{i,f''}(p+bi,q+bi)$ represents a pixel value of a pixel having coordinates of (p+bi,q+bi) in the f''th frame of the binocular fusion brightness image of the $G_{dis}{}^i$; and the BO(bi+3,bj+3) represents an element at a subscript of (bi+3,bj+3) in a 5×5 background brightness operator, wherein it is embodied that the 5×5 background brightness operator herein is $$\begin{bmatrix} 1 & 1 & 1 & 1 & 1 \\ 1 & 2 & 2 & 2 & 1 \\ 1 & 2 & 0 & 2 & 1 \\ 1 & 2 & 2 & 2 & 1 \\ 1 & 1 & 1 & 1 & 1 \end{bmatrix};$$

⑦-5, calculating a brightness difference image between each frame of the binocular fusion brightness image and the previous frame of the binocular fusion brightness image of each frame of the binocular fusion brightness image in the $G_{dis}{}^i$ except the first frame of the binocular fusion brightness image; denoting the brightness difference image between the f'th frame of the binocular fusion brightness image in the $G_{dis}{}^i$ and an f'-1th frame of the binocular fusion brightness image in the $G_{dis}{}^i$ as $LD_{dis}{}^{i,f'}$; and denoting a pixel value of a second pixel having the coordinates of (p,q) in the $LD_{dis}{}^{i,f'}$ as $LD_{dis}{}^{i,f'}(p,q)$, $$LD_{dis}^{i,f'}(p,q) = (I_{dis}^{i,f'}(p,q) - I_{dis}^{i,f'-1}(p,q) + BL_{dis}^{i,f'}(p,q) - BL_{dis}^{i,f'-1}(p,q))/2,$$

wherein: $2 \leq f' \leq 2^n$; $3 \leq p \leq U-2, 3 \leq q \leq V-2$; the $I_{dis}{}^{i,f'}(p,q)$ represents a pixel value of a third pixel having the coordinates of (p,q) in the f'th frame of the binocular fusion brightness image in the $G_{dis}{}^i$; the $I_{dis}{}^{i,f'-1}(p,q)$ represents a pixel value of a fourth pixel having the coordinates of (p,q) in the f'-1th frame of the binocular fusion brightness image in the $G_{dis}{}^i$; the $BL_{dis}{}^{i,f'}(p,q)$ represents a pixel value of a fifth pixel having the coordinates of (p,q) in the background brightness image $BL_{dis}{}^{i,f'}$ of the f'th frame of the binocular fusion brightness image of the $G_{dis}{}^i$; and the $BL_{dis}{}^{i,f'-1}(p,q)$ represents a pixel value of a sixth pixel having the coordinates of (p,q) in the background brightness image $BL_{dis}{}^{i,f'-1}$ of the f'-1th frame of the binocular fusion brightness image of the $G_{dis}{}^i$;

⑦-6, calculating a mean value of the pixel values of all the pixels in the brightness difference image between each frame of the binocular fusion brightness image and the previous frame of the binocular fusion brightness image of each frame of the binocular fusion brightness image in the $G_{dis}{}^i$ except the first frame of the binocular fusion brightness image; denoting the mean value of the pixel values of all the pixels in the $LD_{dis}{}^{i,f'}$ as $LD^{i,f'}$; calculating a brightness difference value of the $G_{dis}{}^i$ and denoting the brightness difference value of the $G_{dis}{}^i$ as $LDavg^i$, $$LDavg^i = \frac{\sum_{f'=2}^{2^n} LD^{i,f'}}{2^n - 1};$$

⑦-7, obtaining a motion intensity vector of the $B_{dis}$ from the respective motion intensities of all the frame groups in the $B_{dis}$ in order, and denoting the motion intensity vector of the $B_{dis}$ as $V_{MAavg}$, $$V_{MAavg} = [MAavg^1, MAavg^2, \ldots, MAavg^i, \ldots, MAavg^{n_{GoF}}];$$

obtaining a brightness difference vector of the $B_{dis}$ from the respective brightness difference values of all the frame groups in the $B_{dis}$ in order, and denoting the brightness difference vector of the $B_{dis}$ as $V_{LDavg}$, $$V_{LDavg} = [LDavg^1, LDavg^2, \ldots, LDavg^i, \ldots, LDavg^{n_{GoF}}];$$

wherein:
the $MAavg^1$, the $MAavg^2$, and the $MAavg^{n_{GoF}}$ respectively represent the motion intensities of a first frame group, a second frame group and a $n_{GoF}$th frame group in the $B_{dis}$; the $LDavg^1$, the $LDavg^2$, and the $LDavg^{n_{GoF}}$ respectively represent the brightness difference value of the first frame group, the second frame group and the $n_{GoF}$th frame group in the $B_{dis}$;

⑦-8, processing the $MAavg^i$ with a normalization calculation, and obtaining a normalized motion intensity of the $G_{dis}{}^i$, denoted as $v_{MAavg}^{norm,i}$;

$$v_{MAavg}^{norm,i} = \frac{MAavg^i - \max(V_{MAavg})}{\max(V_{MAavg}) - \min(V_{MAavg})};$$

processing the $LDavg^i$ with the normalization calculation, and obtaining a normalized brightness difference value of the $G_{dis}^i$, denoted as $v_{LDavg}^{norm,i}$, $$v_{LDavg}^{norm,i} = \frac{LDavg^i - \max(V_{LDavg})}{\max(V_{LDavg}) - \min(V_{LDavg})};$$

wherein the max( ) is a function to find a maximum and the min( ) is a function to find a minimum; and ⑦-9, according to the $v_{MAavg}^{norm,i}$ and the $v_{LDavg}^{norm,i}$, calculating the weight $w^i$ of the $Q_{GoF}^i$, $w^i = (1-v_{MAavg}^{norm,i}) \times v_{LDavg}^{norm,i}$.

In order to illustrate effectiveness and feasibility of the method provided by the present invention, a NAMA3DS1-CoSpaD1 stereoscopic video database (NAMA3D video database in short) provided by a French IRCCyN research institution is adopted for a verification test, for analyzing a correlation between an objective assessment result of the method provided by the present invention and a difference mean opinion score (DMOS). The NAMA3D video database comprises 10 original high-definition stereoscopic videos showing different scenes. Each original high-definition stereoscopic video is treated with an H.264 coding compression distortion or a JPEG2000 coding compression distortion. The H.264 coding compression distortion has 3 different distortion degrees, namely totally 30 first distorted stereoscopic videos; and the JPEG2000 coding compression distortion has 4 different distortion degrees, namely totally 40 second distorted stereoscopic videos. Through the steps ①-⑦ of the method provided by the present invention, the above 70 distorted stereoscopic videos are calculated in the same manner to obtain an objective assessment quality of each distorted stereoscopic video relative to a corresponding undistorted stereoscopic video; then the objective assessment quality of each distorted stereoscopic video is processed through a four-parameter Logistic function non-linear fitting with the DMOS; and finally, a performance index value between the objective assessment result and a subjective perception is obtained. Herein, three common objective parameters for assessing a video quality assessment method serve as assessment indexes. The three objective parameters are respectively Correlation coefficient (CC), Spearman Rank Order Correlation coefficient (SROCC) and Rooted Mean Squared Error (RMSE). A range of the value of the CC and the SROCC is [0, 1]. The nearer a value approximates to 1, the more accurate an objective assessment method is; otherwise, the objective assessment method is less accurate. The smaller RMSE, the higher accuracy of a predication of the objective assessment method, and the better performance of the objective assessment method; otherwise, the predication of the objective assessment method is worse. The assessment indexes, CC, SROCC and RMSE, for representing the performance of the method provided by the present invention are listed in Table 1. According to data listed in the Table 1, the objective assessment quality of the distorted stereoscopic video, which is obtained through the method provided by the present invention, has a good correlation with the DMOS. For H.264 coding compression distorted videos, the CC reaches 0.8712; the SROCC reaches 0.8532; and the RMSE is as low as 5.7212. For JPEG2000 coding compression distorted videos, the CC reaches 0.9419; the SROCC reaches 0.9196; and the RMSE is as low as 4.1915. For an overall distorted video comprising both the H.264 coding compression distorted videos and the JPEG2000 coding compression distorted videos, the CC reaches 0.9201; the SROCC reaches 0.8910; and the RMSE is as low as 5.0523. Thus, the objective assessment result of the method provided by the present invention is relatively consistent with a human eye subjective perception result, which fully proves the effectiveness of the method provided by the present invention.

TABLE 1

Correlation between objective assessment quality of distorted stereoscopic video calculated through method provided by present invention and DMOS

|  | CC | SROCC | RMSE |
|---|---|---|---|
| 30 H.264 coding compression stereoscopic videos | 0.8712 | 0.8532 | 5.7212 |
| 40 JPEG2000 coding compression stereoscopic videos | 0.9419 | 0.9196 | 4.1915 |
| Totally 70 distorted stereoscopic videos | 0.9201 | 0.8910 | 5.0523 |

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An objective assessment method for a stereoscopic video quality based on a wavelet transform, comprising steps of:

① representing an original undistorted stereoscopic video by $V_{org}$, and representing a distorted stereoscopic video to-be-assessed by $V_{dis}$;

② calculating a binocular fusion brightness of each pixel in each frame of a stereoscopic image of the $V_{org}$; denoting the binocular fusion brightness of a first pixel having coordinates of (u,v) in an f th frame of the stereoscopic image of the $V_{org}$ as $B_{org}^f(u,v)$, $B_{org}^f(u,v) = \sqrt{(I_{org}^{R,f}(u,v))^2 + (I_{org}^{L,f}(u,v))^2 + 2(I_{org}^{R,f}(u,v) \times_{org} I_{org}^{L,f}(u,v) \times \sqrt{\cos\theta}) \times \lambda}$; then according to the respective binocular fusion brightnesses of all the pixels in each frame of the stereoscopic image of the $V_{org}$, obtaining a binocular fusion brightness image of each frame of the stereoscopic image in the $V_{org}$; denoting the binocular fusion brightness image of the f th frame of the stereoscopic image in the $V_{org}$ as $B_{org}^f$, wherein a second pixel having the coordinates of (u,v) in the $B_{org}^f$ has a pixel value of the $B_{org}^f(u,v)$; according to the respective binocular fusion brightness images of all the stereoscopic images in the $V_{org}$, obtaining a binocular fusion brightness image video corresponding to the $V_{org}$, denoted as $B_{org}$, wherein an f th frame of the binocular fusion brightness image in the $B_{org}$ is the $B_{org}^f$; and calculating a binocular fusion brightness of each pixel in each frame of a stereoscopic image of the $V_{dis}$; denoting the binocular fusion brightness of a third pixel having the coordinates of (u,v) in an f th frame of the stereoscopic image of the $V_{dis}$ as $B_{dis}^{f}(u,v)$, $B_{dis}^{f}(u,v)=\sqrt{(I_{dis}^{R,f}(u,v))^2+(I_{dis}^{L,f}(u,v))^2+2(I_{dis}^{R,f}(u,v)\times I_{dis}^{L,f}(u,v)\times \sqrt{\cos\partial})\times\lambda}$; then according to the respective binocular fusion brightnesses of all the pixels in each frame of the stereoscopic image of the $V_{dis}$, obtaining a binocular fusion brightness image of each frame of the stereoscopic image in the $V_{dis}$; denoting the binocular fusion brightness image of the f th frame of the stereoscopic image in the $V_{dis}$ as $B_{dis}^{f}$, wherein a fourth pixel having the coordinates of (u,v) in the $B_{dis}^{f}$ has a pixel value of the $B_{dis}^{f}(u,v)$; according to the respective binocular fusion brightness images of all the stereoscopic images in the $V_{dis}$, obtaining a binocular fusion brightness image video corresponding to the $V_{dis}$, denoted as $B_{dis}$, wherein an f th frame of the binocular fusion brightness image in the $B_{dis}$ is the $B_{dis}^{f}$; wherein:

$1 \leq f \leq N_f$, wherein the f has an initial value of 1; the $N_f$ represents a total frame number of the stereoscopic images respectively in the $V_{org}$ and the $V_{dis}$; $1 \leq u \leq U$, $1 \leq v \leq V$, wherein the U represents a width of the stereoscopic image respectively in the $V_{org}$ and the $V_{dis}$, and the V represents a height of the stereoscopic image respectively in the $V_{org}$ and the $V_{dis}$; the $I_{org}^{R,f}(u,v)$ represents a brightness value of a fifth pixel having the coordinates of (u,v) in a right viewpoint image of the f th frame of the stereoscopic image of the $V_{org}$; the $I_{org}^{L,f}(u,v)$ represents a brightness value of a sixth pixel having the coordinates of (u,v) in a left viewpoint image of the f th frame of the stereoscopic image of the $V_{org}$; the $I_{dis}^{R,f}(u,v)$ represents a brightness value of a seventh pixel having the coordinates of (u,v) in a right viewpoint image of the f th frame of the stereoscopic image of the $V_{dis}$; the $I_{dis}^{L,f}(u,v)$ represents a brightness value of an eighth pixel having the coordinates of (u,v) in a left viewpoint image of the f th frame of the stereoscopic image of the $V_{dis}$; the $\partial$ represents a fusion angle; and the $\lambda$ represents a brightness parameter of a display;

③ adopting $2^n$ frames of the binocular fusion brightness images as a frame group; respectively dividing the $B_{org}$ and the $B_{dis}$ into $n_{GoF}$ frame groups; denoting an i th frame group in the $B_{org}$ as $G_{org}^{i}$; and denoting an i th frame group in the $B_{dis}$ as $G_{dis}^{i}$; wherein: the n is an integer in a range of [3,5];

$$n_{GoF} = \left\lfloor \frac{N_f}{2^n} \right\rfloor,$$

wherein the $\lfloor \ \rfloor$ is a round-down symbol; and $1 \leq i \leq n_{GoF}$;

④ processing each frame group in the $B_{org}$ with a one-level three-dimensional wavelet transform, and obtaining eight groups of first sub-band sequences corresponding to each frame group in the $B_{org}$, wherein: the eight groups of the first sub-band sequences comprise four groups of first time-domain high-frequency sub-band sequences and four groups of first time-domain low-frequency sub-band sequences; and each group of the first sub-band sequence comprises $$\frac{2^n}{2}$$

first wavelet coefficient matrixes; and processing each frame group in the $B_{dis}$ with the one-level three-dimensional wavelet transform, and obtaining eight groups of second sub-band sequences corresponding to each frame group in the $B_{dis}$, wherein: the eight groups of the second sub-band sequences comprise four groups of second time-domain high-frequency sub-band sequences and four groups of second time-domain low-frequency sub-band sequences; and each group of the second sub-band sequence comprises $$\frac{2^n}{2}$$

second wavelet coefficient matrixes;

⑤ calculating respective qualities of two groups among the eight groups of the second sub-band sequences corresponding to each frame group in the $B_{dis}$; and denoting a quality of a j th group of the second sub-band sequence corresponding to the $G_{dis}^{i}$ as $$Q^{i,j}, Q^{i,j} = \frac{\sum_{k=1}^{K} SSIM(VI_{org}^{i,j,k}, VI_{dis}^{i,j,k})}{K},$$

wherein: j=1,5; the $1 \leq k \leq K$; the K represents a total number of the wavelet coefficient matrixes respectively in each group of the first sub-band sequence corresponding to each frame group in the $B_{org}$ and each group of the second sub-band sequence corresponding to each frame group in the $B_{dis}$; and $$K = \frac{2^n}{2};$$

the $VI_{org}^{i,j,k}$ represents a k th first wavelet coefficient matrix of a j th group of the first sub-band sequence corresponding to the $G_{org}^{i}$; the $VI_{dis}^{i,j,k}$ represents a k th second wavelet coefficient matrix of the j th group of the second sub-band sequence corresponding to the $G_{dis}^{i}$; and SSIM( ) is a structural similarity calculation function;

⑥ according to the respective qualities of two groups among the eight groups of the second sub-band sequences corresponding to each frame group in the $B_{dis}$, calculating a quality of each frame group in the $B_{dis}$; and denoting the quality of the $G_{dis}^{i}$ as $Q_{GoF}^{i}$, $Q_{GoF}^{i} = w_G \times Q^{i,1} + (1-w_G) \times Q^{i,5}$, wherein: the $w_G$ is a weight of the $Q^{i,1}$; the $Q^{i,1}$ represents the quality of a first group of the second sub-band sequence corresponding to the $G_{dis}^{i}$; and the $Q^{i,5}$ represents the quality of a fifth group of the second sub-band sequence corresponding to the $G_{dis}^{i}$; and ⑦ according to the quality of each frame group in the $B_{dis}$, calculating an objective assessment quality of the $V_{dis}$ and denoting the objective assessment quality of the $$V_{dis} \text{ as } Q_v, Q_v = \frac{\sum_{i=1}^{n_{GoF}} w^i \times Q_{GoF}^i}{\sum_{i=1}^{n_{GoF}} w^i},$$

wherein the $w^i$ is a weight of the $Q_{GoF}^i$.

2. The objective assessment method for the stereoscopic video quality based on the wavelet transform, as recited in claim 1, wherein the $w^i$ in the step ⑦ is obtained through steps of:

⑦-1, calculating a motion vector of each pixel in each frame of the binocular fusion brightness image of the $G_{dis}^i$ except a first frame of the binocular fusion brightness image, with a reference to a previous frame of the binocular fusion brightness image of each frame of the binocular fusion brightness image in the $G_{dis}^i$ except the first frame of the binocular fusion brightness image;

⑦-2, according to the motion vector of each pixel in each frame of the binocular fusion brightness image of the $G_{dis}^i$ except the first frame of the binocular fusion brightness image, calculating a motion intensity of each frame of the binocular fusion brightness image in the $G_{dis}^i$ except the first frame of the binocular fusion brightness image; and denoting the motion intensity of an f'th frame of the binocular fusion brightness image in the $G_{dis}^i$ as $MA^{f'}$, $$MA^{f'} = \frac{1}{U \times V} \sum_{s=1}^{U} \sum_{t=1}^{V} ((mv_x(s,t))^2 + (mv_y(s,t))^2);$$

wherein: $2 \leq f' \leq 2^n$; the f' has an initial value of 2; $1 \leq s \leq U$, $1 \leq t \leq V$; the $mv_x(s,t)$ represents a horizontal component of the motion vector of a pixel having coordinates of (s,t) in the f'th frame of the binocular fusion brightness image in the $G_{dis}^i$; and the $mv_y(s,t)$ represents a vertical component of the pixel having the coordinates of (s,t) in the f'th frame of the binocular fusion brightness image in the $G_{dis}^i$;

⑦-3, calculating a motion intensity of the $G_{dis}^i$, denoted as $MAavg^i$, $$MAavg^i = \frac{\sum_{f'=2}^{2^n} MA^{f'}}{2^n - 1};$$

⑦-4, calculating a background brightness image of each frame of the binocular fusion brightness image in the $G_{dis}^i$; denoting the background brightness image of an f''th frame of the binocular fusion brightness image in the $G_{dis}^i$ as $BL_{dis}^{i,f''}$; and denoting a pixel value of a first pixel having coordinates of (p,q) in the $BL_{dis}^{i,f''}$ as $BL_{dis}^{i,f''}(p,q)$, $$BL_{dis}^{i,f''}(p,q) = \frac{1}{32} \sum_{bi=-2}^{2} \sum_{bj=-2}^{2} I_{dis}^{i,f''}(p+bi, q+bi) \times BO(bi+3, bj+3),$$

wherein: $1 \leq f'' \leq 2^n$; $3 \leq p \leq U-2, 3 \leq q \leq V-2$; $-2 \leq bi \leq 2, -2 \leq bj \leq 2$; the $I_{dis}^{i,f''}(p+bi,q+bi)$ represents a pixel value of a pixel having coordinates of (p+bi,q+bi) in the f''th frame of the binocular fusion brightness image of the $G_{dis}^i$; and the $BO(bi+3,bj+3)$ represents an element at a subscript of (bi+3,bj+3) in a 5×5 background brightness operator;

⑦-5, calculating a brightness difference image between each frame of the binocular fusion brightness image and the previous frame of the binocular fusion brightness image of each frame of the binocular fusion brightness image in the $G_{dis}^i$ except the first frame of the binocular fusion brightness image; denoting the brightness difference image between the f'th frame of the binocular fusion brightness image in the $G_{dis}^i$ and an f'−1th frame of the binocular fusion brightness image in the $G_{dis}^i$ as $LD_{dis}^{i,f'}$; and denoting a pixel value of a second pixel having the coordinates of (p,q) in the $LD_{dis}^{i,f'}$ as $LD_{dis}^{i,f'}(p,q)$, $$LD_{dis}^{i,f'}(p,q) = (I_{dis}^{i,f'}(p,q) - I_{dis}^{i,f'-1}(p,q) + BL_{dis}^{i,f'}(p,q) - BL_{dis}^{i,f'-1}(p,q))/2,$$

wherein: $2 \leq f' \leq 2^n$; $3 \leq p \leq U-2, 3 \leq q \leq V-2$; the $I_{dis}^{i,f'}(p,q)$ represents a pixel value of a third pixel having the coordinates of (p,q) in the f'th frame of the binocular fusion brightness image in the $G_{dis}^i$; the $I_{dis}^{i,f'-1}(p,q)$ represents a pixel value of a fourth pixel having the coordinates of (p,q) in the f'−1th frame of the binocular fusion brightness image in the $G_{dis}^i$; the $BL_{dis}^{i,f'}(p,q)$ represents a pixel value of a fifth pixel having the coordinates of (p,q) in the background brightness image $BL_{dis}^{i,f'}$ of the f'th frame of the binocular fusion brightness image of the $G_{dis}^i$; and the $BL_{dis}^{i,f'-1}(p,q)$ represents a pixel value of a sixth pixel having the coordinates of (p,q) in the background brightness image $BL_{dis}^{i,f'-1}$ of the f'−1th frame of the binocular fusion brightness image of the $G_{dis}^i$;

⑦-6, calculating a mean value of the pixel values of all the pixels in the brightness difference image between each frame of the binocular fusion brightness image and the previous frame of the binocular fusion brightness image of each frame of the binocular fusion brightness image in the $G_{dis}^i$ except the first frame of the binocular fusion brightness image; denoting the mean value of the pixel values of all the pixels in the $LD_{dis}^{i,f'}$ as $LD^{i,f'}$; calculating a brightness difference value of the $G_{dis}^i$ and denoting the brightness difference value of the $G_{dis}^i$ as $LDavg^i$, $$LDavg^i = \frac{\sum_{f'=2}^{2^n} LD^{i,f'}}{2^n - 1};$$

⑦-7, obtaining a motion intensity vector of the $B_{dis}$ from the respective motion intensities of all the frame groups in the $B_{dis}$ in order, and denoting the motion intensity vector of the $B_{dis}$ as $V_{MAavg}$, $$V_{MAavg} = [MAavg^1, MAavg^2, \ldots, MAavg^i, \ldots, MAavg^{n_{GoF}}];$$

obtaining a brightness difference vector of the $B_{dis}$ from the respective brightness difference values of all the frame groups in the $B_{dis}$ in order, and denoting the brightness difference vector of the $B_{dis}$ as $V_{LDavg}$, $$V_{LDavg} = [LDavg^1, LDavg^2, \ldots, LDavg^i, \ldots, LDavg^{n_{GoF}}];$$

wherein:

the MAavg$^1$, the MAavg$^2$, and the MAavg$^{n_{GoF}}$ respectively represent the motion intensities of a first frame group, a second frame group and a $n_{GoF}$th frame group in the $B_{dis}$; the LDavg$^1$, the LDavg$^2$, and the LDavg$^{n_{GoF}}$ respectively represent the brightness difference value of the first frame group, the second frame group and the $n_{GoF}$th frame group in the $B_{dis}$;

⑦-8, processing the MAavg$^i$ with a normalization calculation, and obtaining a normalized motion intensity of the $G_{dis}^i$, denoted as $v_{MAavg}^{norm,i}$, $$v_{MAavg}^{norm,i} = \frac{MAavg^i - \max(V_{MAavg})}{\max(V_{MAavg}) - \min(V_{MAavg})};$$

processing the LDavg$^i$ with the normalization calculation, and obtaining a normalized brightness difference value of the $G_{dis}^i$, denoted as $v_{LDavg}^{norm,i}$, $$v_{LDavg}^{norm,i} = \frac{LDavg^i - \max(V_{LDavg})}{\max(V_{LDavg}) - \min(V_{LDavg})};$$

wherein the max( ) is a maximum function and the min( ) is a minimum function; and ⑦-9, according to the $v_{MAavg}^{norm,i}$ and the $v_{LDavg}^{norm,i}$, calculating the weight $w^i$ of the $Q_{GoF}^i$, $w^i = (1 - v_{MAavg}^{norm,i}) \times v_{LDavg}^{norm,i}$.

3. The objective assessment method for the stereoscopic video quality based on the wavelet transform, as recited in claim 1, wherein: in the step ⑥, $w_G = 0.8$.

4. The objective assessment method for the stereoscopic video quality based on the wavelet transform, as recited in claim 2, wherein: in the step ⑥, $w_G = 0.8$.

* * * * *